(12) United States Patent
Bartlett et al.

(10) Patent No.: US 11,178,878 B2
(45) Date of Patent: *Nov. 23, 2021

(54) SYSTEM, DEVICE, AND METHOD FOR OVEN TEMPERATURE CONTROL IN TORTILLA AND TORTILLA CHIP PRODUCTION

(71) Applicant: Premier Innovations, LLC, Austin, TX (US)

(72) Inventors: Brian E. Bartlett, Etna, WY (US); Douglas W. Cotton, Katy, TX (US)

(73) Assignee: Premier Innovations, LLC, Austin, TX (US)

(*) Notice: Subject to any disclaimer, the term of this patent is extended or adjusted under 35 U.S.C. 154(b) by 268 days.

This patent is subject to a terminal disclaimer.

(21) Appl. No.: 16/293,401

(22) Filed: Mar. 5, 2019

(65) Prior Publication Data

US 2019/0191717 A1 Jun. 27, 2019

Related U.S. Application Data

(63) Continuation of application No. 14/964,193, filed on Dec. 9, 2015, now Pat. No. 10,244,766.

(51) Int. Cl.
*A21B 1/40* (2006.01)
*F23N 1/00* (2006.01)
*F23N 5/02* (2006.01)
*A21D 13/42* (2017.01)

(52) U.S. Cl.
CPC ............ *A21B 1/40* (2013.01); *A21D 13/42* (2017.01); *F23N 1/002* (2013.01); *F23N 5/022* (2013.01); *F23N 2223/36* (2020.01); *F23N 2223/44* (2020.01); *F23N 2225/14* (2020.01); *F23N 2235/12* (2020.01); *F23N 2237/02* (2020.01); *F23N 2241/08* (2020.01)

(58) Field of Classification Search
CPC ..... A23L 3/18; A23L 3/185; A23L 5/10; A23L 19/18; A47J 37/044; A21B 1/40
USPC ....................................................... 126/41 C
See application file for complete search history.

(56) References Cited

U.S. PATENT DOCUMENTS

| | | | |
|---|---|---|---|
| 8,839,714 B2 * | 9/2014 | Schjerven, Sr. ...... | A47J 37/045 99/476 |
| 8,839,779 B2 * | 9/2014 | Wiker .................... | A21B 1/48 126/19 R |

* cited by examiner

*Primary Examiner* — John J Norton
(74) *Attorney, Agent, or Firm* — Olav M. Underdal; IDP Patent Services

(57) ABSTRACT

A heat controlled oven system includes a plurality of oven levels, including an oven belt and gas burners; a gas flow network, including a gas supply line, a variable flow control valve, and on/off flow control valves; and a heat control unit, including a processor, a non-transitory memory, and input/output component, a heat modeler, a heat manager, a feedback controller, and a valve controller, such that the heat control unit is configured to calculate an estimated heat demand to adjust to a temperature set point, based on a heat model of the at least one oven level, and further calculates an optimized heat demand using a control loop feedback algorithm. Also disclosed is a method of heat calculation for an oven, including defining a heat model, calculating and optimizing the estimated heat demand, calculating and setting a variable valve position for the gas burners.

12 Claims, 7 Drawing Sheets

Heat Calculation Flow

Heat Controlled Oven System

Heat Calculation Flow

Gas Flow for Single Belt

Gas Flow for Single Belt

SYSTEM, DEVICE, AND METHOD FOR OVEN TEMPERATURE CONTROL IN TORTILLA AND TORTILLA CHIP PRODUCTION

CROSS-REFERENCE TO RELATED APPLICATIONS

This application is a continuation of U.S. Non-Provisional application Ser. No. 14/964,193, filed Dec. 9, 2015; which is hereby incorporated herein by reference in its entirety.

FIELD OF THE INVENTION

The present invention relates generally to the field of tortilla production, and more particularly to methods and systems for controlling oven temperature during baking of tortillas, tortilla chips, and other food products.

BACKGROUND OF THE INVENTION

A variety of designs have been developed for ovens used in industrial food production. For tortilla chip production ovens typically have multiple belts, and can be either arranged linearly or stacked. Most designs have at least one gas burner per belt, with more complex ovens using multiple burners per belt. A number of designs have been developed to optimize energy efficiency, by ensuring containment of heat between different belt-stages.

Despite development in oven designs and thereto related improved energy efficiency, it remains very difficult to control the temperature in large industrial ovens. Even with use of modern control algorithms, the temperature may not be well controlled within an acceptable tolerance, and periodic temperature oscillations may produce undesirable quality variations in the finished product.

As such, considering the foregoing, it may be appreciated that there continues to be a need for novel and improved devices and methods for controlling the temperature in industrial ovens used in food production.

SUMMARY OF THE INVENTION

The foregoing needs are met, to a great extent, by the present invention, wherein in aspects of this invention, enhancements are provided to the existing model of oven temperature control.

In an aspect, a temperature controlled oven system, can include:
a) a plurality of oven levels, each including:
   an oven belt, which transports food products that are positioned on the oven belt; and
   gas burners, which are configured to bake or toast the food products that are transported on the oven belt; and
b) a heat control unit, which can control the gas burners, in order to control the baking temperature of the oven levels;
such that the heat control unit can calculate an estimated heat demand to adjust to a temperature set point, based on a heat model for each of the oven levels.

In a related aspect, the heat controlled oven system can further include a gas flow network which is connected to at least one oven level, the gas flow network including a pressure regulated gas supply line; a variable flow control valve, which is connected to the gas supply line; at least one on/off flow control valve, which is connected to an output from the variable flow control valve, such that an output from the at least one on/off flow control valves is connected to at least one gas burner.

In another related aspect, the heat control unit can further include:
a) a processor;
b) a non-transitory memory;
c) an input/output component; and a
d) a heat modeler, which is configured to store the heat model;
e) a heat manager, which is configured to calculate the estimated heat demand to adjust the oven level to the temperature set point;
f) a feedback controller, which is configured to execute a control loop feedback algorithm to calculate an optimized heat demand value based on the estimated heat demand; and
g) a valve controller, which is configured to calculate an optimal valve position for a variable flow control valve and adjust the variable flow control valve to the optimal valve position, such that the heat output is equal to the optimized heat demand.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

Figure 1:
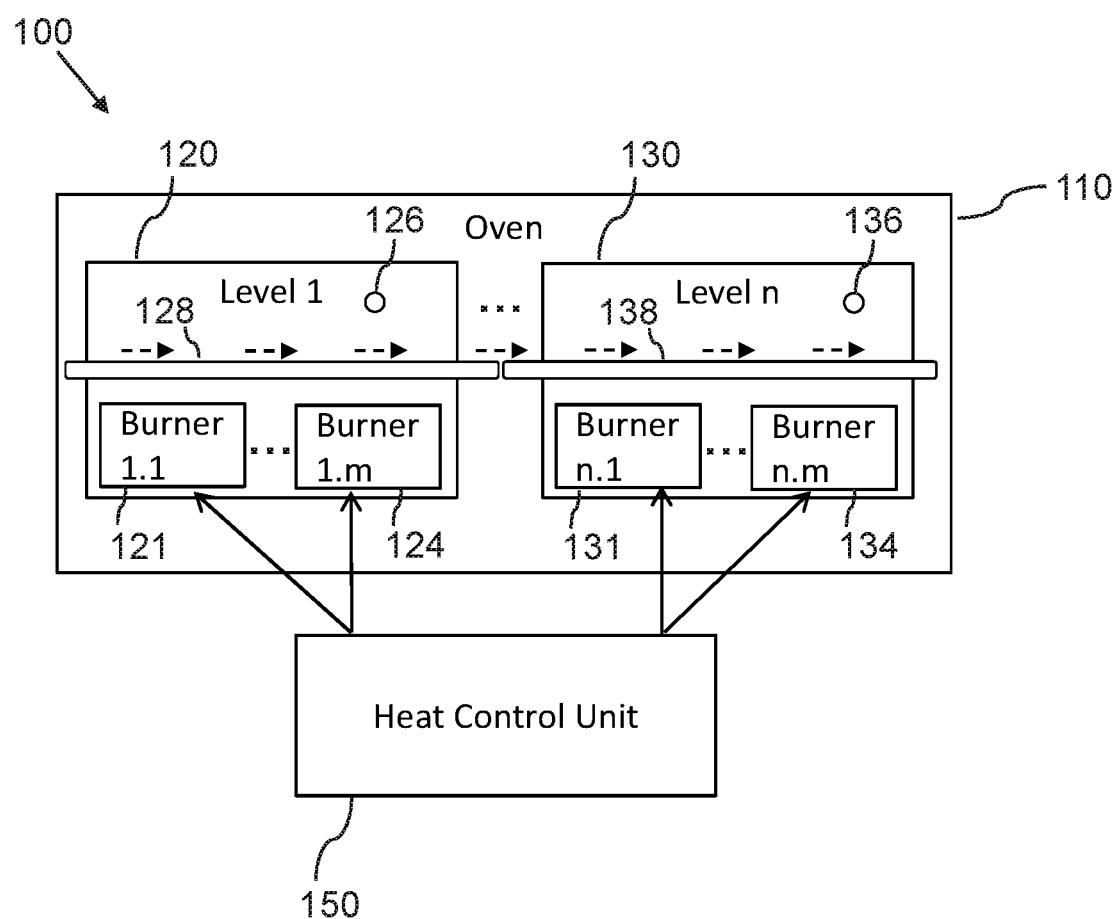
FIG. 1 is a schematic diagram illustrating a temperature controlled oven system, according to an embodiment of the invention.

In the following, we describe the structure of an embodiment of a heat controlled oven system 100 with reference to FIG. 1, in such manner that like reference numerals refer to like components throughout; a convention that we shall employ for the remainder of this specification.

In an embodiment, a heat controlled oven system 100 for stable temperature control in tortilla chip production and other food production can include:
a) an oven 110, including:
  i. a plurality of n oven levels 120 130, each further including
    an oven belt 128 138, which is configured to transport food products that are positioned on the oven belt 128 138; and
    a plurality of m gas burners 121 124 131 134, which are configured to bake the food products that are transported on the oven belt 128 138;
b) A heat control unit 150, which is configured to control the gas burners 121 124 131 134, in order to control the baking temperature of each oven level 120 130 in the oven 110.

Figure 2:
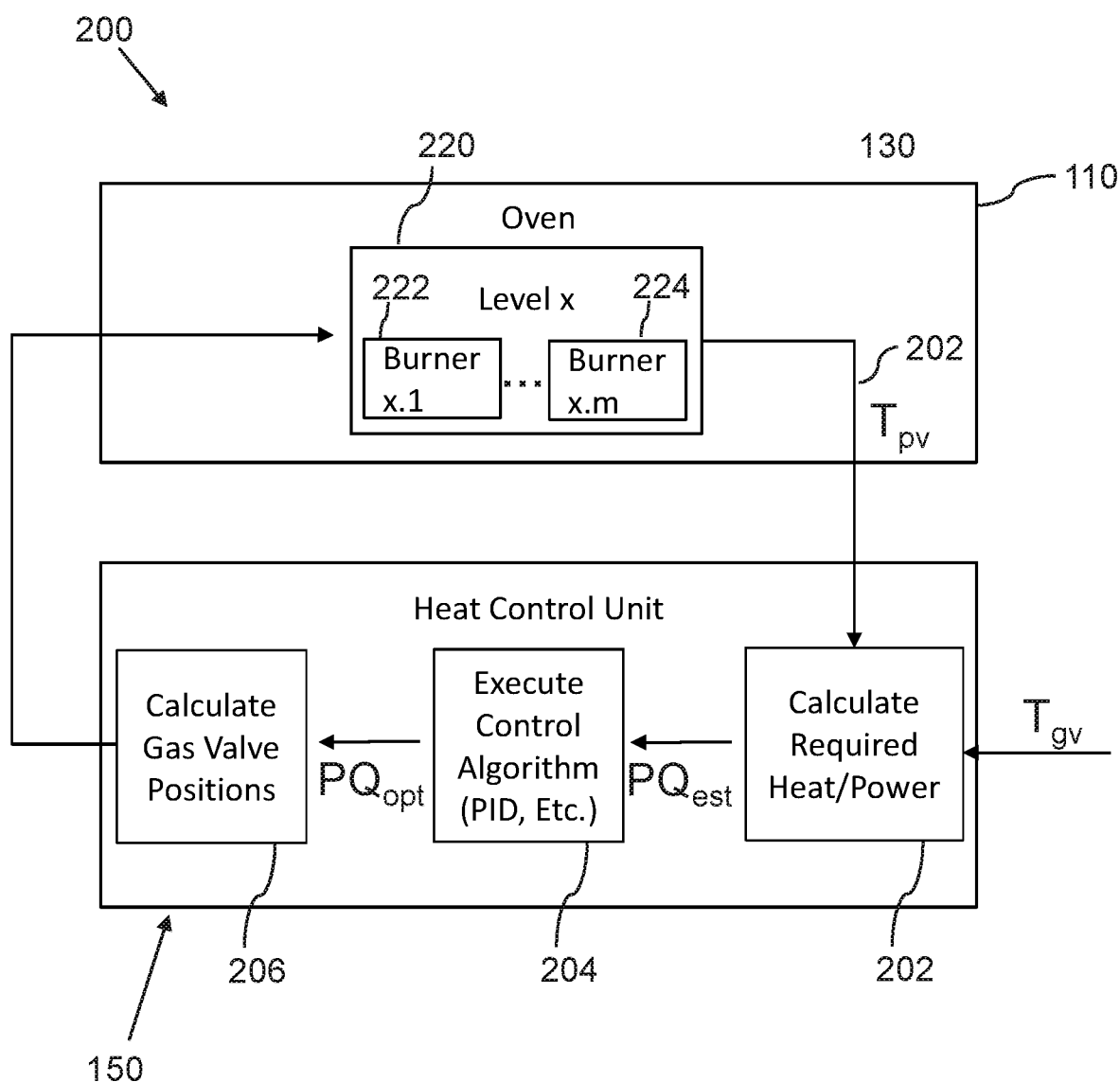
FIG. 2 is a schematic diagram illustrating a heat calculation flow, according to an embodiment of the invention.

In a related embodiment, FIG. 2 illustrates a heat calculation flow or method 200 for a single oven level 220 in the heat controlled oven system 100, the single oven level comprising at least one burner 222, or a plurality of burners 222 224, wherein:
$C_e$ is heat capacity of oven including products in production, wherein the heat capacity is measured in J/K;
$PQ_p$ is heat loss, also called parasitic loss, which is measured in J/s;
$PQ_L$ is heat loss from product load (main loss is typically boiling water), which is measured in J/s;
$PQ_B$ is heat required to hold current temperature, wherein $PQ_B$ is measured in J/s, such that:

$$PQ_B = PQ_p + PQ_L$$

$PQ_m$ is heat required to change the temperature, wherein $PQ_m$ is measured in J/s;
tR is acceptable time to come to temperature;
Tsp is temperature set point, also called temperature target;
Tpv is current temperature (present value);

$$\Delta T = T_{sp} - T_{pv}$$

$$PQ_m = \frac{C_e \Delta T}{t_R} \ [\text{J/s}]$$

$PQ_{sp}$ is estimated heat demand to adjust to a temperature set point [J/s];

$$PQ_{sp} = PQ_B + PQ_m = PQ_p + PQ_L + PQ_m = PQ_p + PQ_L + \frac{C_e \Delta T}{t_R}$$

such that the heat calculation method 200 comprises:
a) Calculating the estimated heat demand 202, wherein the heat control unit 150 receives inputs:
  i. $T_{pv}$, the current oven temperature, which is obtained in communication with a temperature sensor 126 136;
  ii. $T_{gp}$, the temperature set point or target value;
  and calculates $PQ_{sp}$
b) Optimizing the estimated heat demand 204, wherein the heat control unit 150 executes a control loop feedback algorithm to optimize $PQ_{sp}$, thereby calculating an optimized heat demand value, $PQ_{opt}$. The control loop feedback algorithm can for example be a conventional PID control algorithm, whereby a direct measurement of a current temperature differential for input into the control loop feedback is replaced by an input of a current power adjustment $PQ_{sp}$, based on a heat model for the oven level 220;
c) Adjusting valves 206, wherein the heat control unit 150 is configured to adjust valves to calculated position to produce the desired power output $PQ_{opt}$;

In a related embodiment, the control loop feedback algorithm can be configured to operate with the control parameters:
a) PV (process variable)=Heat error;
b) SP (set point/target)=0; and
c) OP (output)=Heat load=$PQ_{opt}$.

Figure 3:
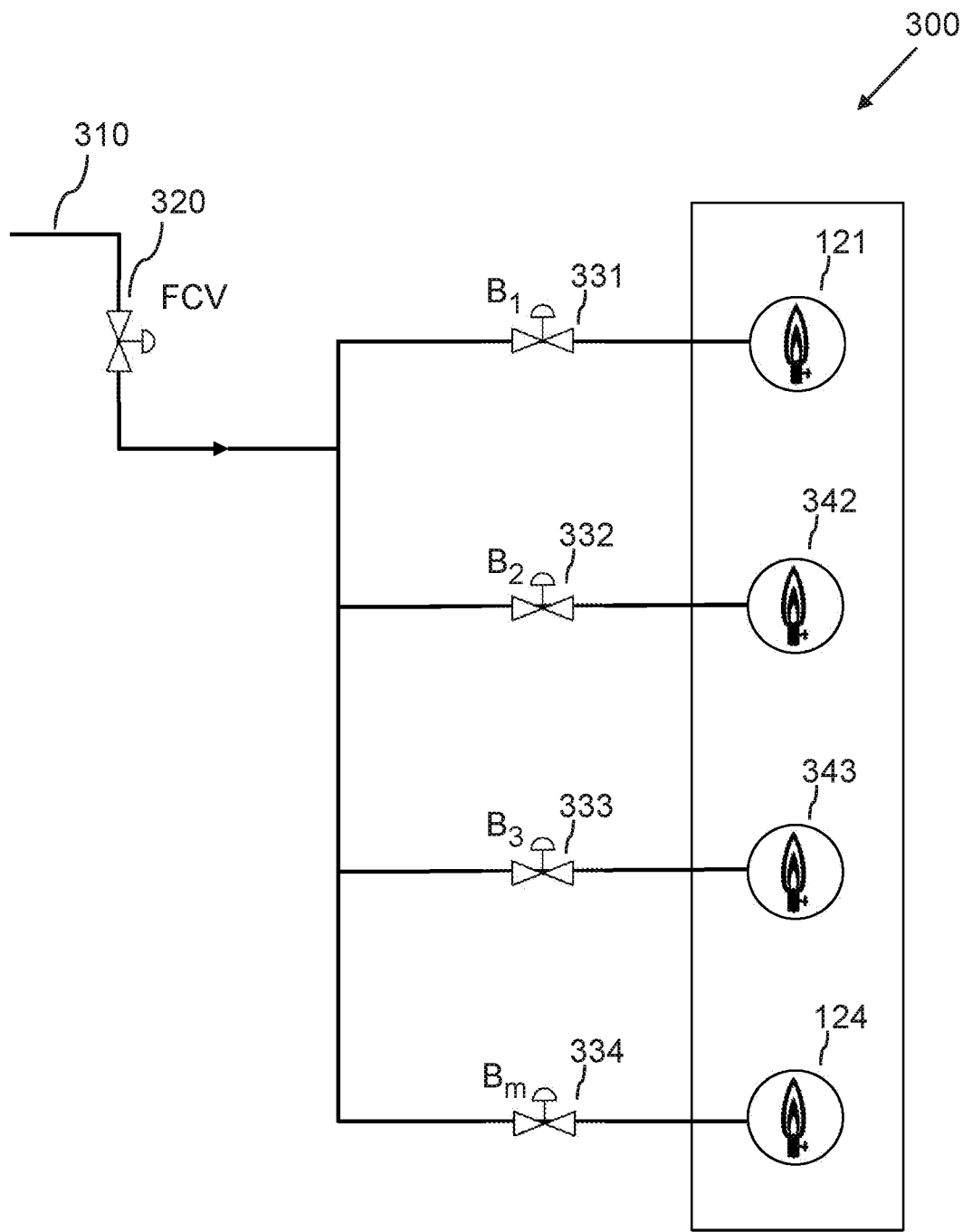
FIG. 3 is a schematic diagram illustrating gas flow for a single belt of an oven, according to an embodiment of the invention.
Figure 4:
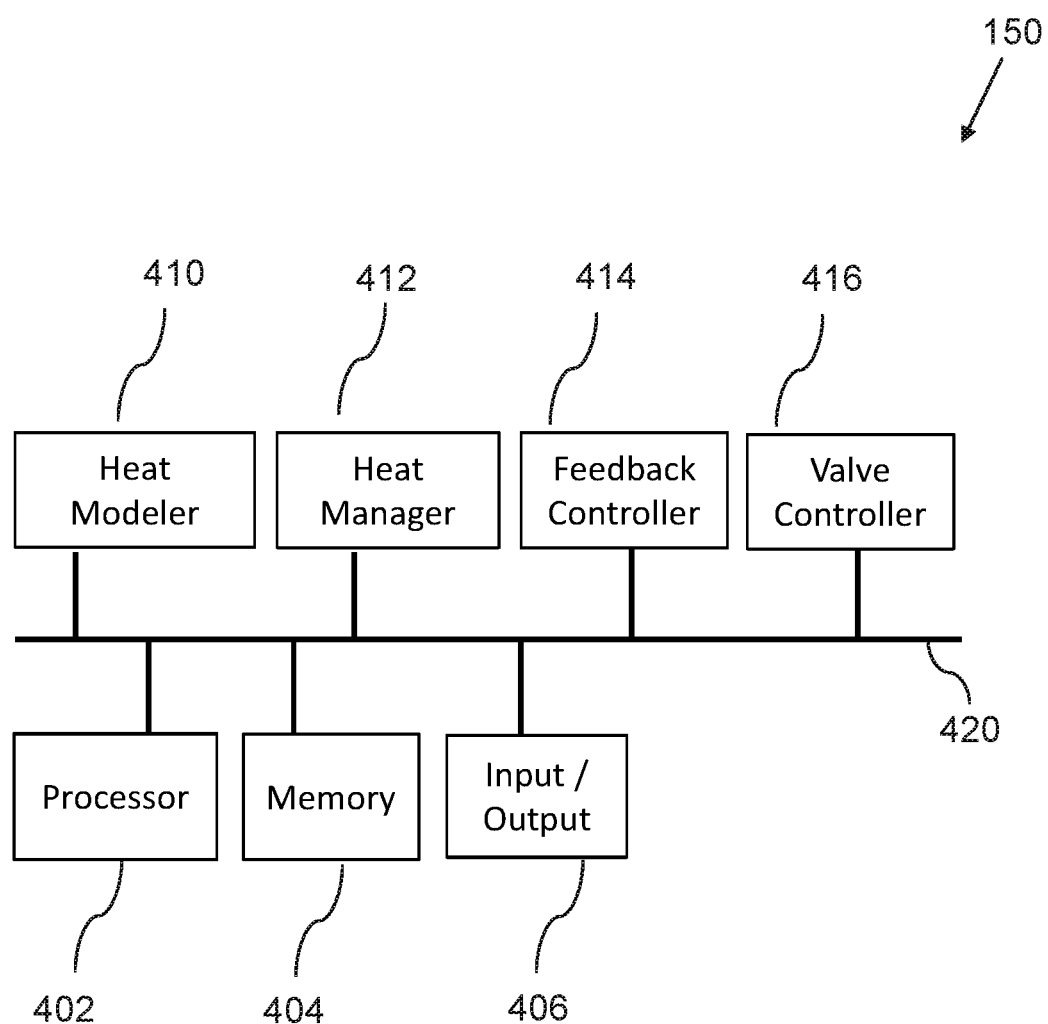
FIG. 4 is a schematic diagram illustrating a temperature control unit, according to an embodiment of the invention.

In a related embodiment, FIG. 3 illustrates a gas flow network 300 for a single oven level 120, with a belt 128, including:
a) a pressure regulated gas supply line 310;
b) a variable flow control valve 320, which is connected to the gas supply line 310; and
c) a plurality of m on/off flow control valves 331 332 333 334, which are connected to an output from the variable flow control valve 320, such that an output from each on/off flow control valves 331 332 333 334 is connected to a burner 121 342 343 124.

In a related embodiment, the gas flow 300 can be configured such that the variable flow control valve 320 can be set to a variable flow control valve position, FCV, such that the current flow is supplied to the m on/off flow control valves 331 332 333 334, with respective on/off valve positions $B_1$, $B_2$, $B_3$, $B_m$, which each have a maximal flow in an open position of respectively $FL_{max1}$, $FL_{max2}$, $FL_{max3}$, $FL_{maxm}$, such that a total flow, $FL_{total}$, is determined as:

$$FL_{total} = FCV(B_1 FL_{max1} + B_2 FL_{max2} + B_3 FL_{max3} + \ldots + B_4 FL_{maxm})$$

In a further related embodiment, for a given heating value, $HV_{gas}$, of the gas flow, and a predetermined setting of the on/off flow control valves 331 332 333 334, with respective predetermined valve positions $B_{1s}$, $B_{2s}$, $B_{3s}$, $B_{4s}$, with the variable flow control valve 320 adjusted to a setting, FCV, such that:

$$PQ_{opt} = HV_{gas}FCV(B_{1s}FL_{max1} + B_{2s}FL_{max2} + B_{3s}FL_{max3} + B_{4s}FL_{max4})$$

In an alternative related embodiment, a gas flow network for a single oven level 120, with a belt 128, can include:

a) a pressure regulated gas supply line 310;
b) optionally, an on/off flow control valve, which is connected to the gas supply line 310; and
c) a plurality of m variable flow control valves, which each are connected to an output from the on/off flow control valve, or directly to the pressure regulated gas supply line 310, such that an output from each variable flow control valves is connected to a burner.

In related embodiments, in accordance with well-known design principles for industrial ovens used in food production, air and fuel can be controlled in order to maintain a constant fuel flow/air flow ratio. This can be implemented with a mechanical linkage. Alternatively, electronic, electromechanical, and/or software based control functions may be used.

In a related embodiment, a heat control unit 150 can be comprised of:

a) A processor 402;
b) A non-transitory memory 404;
c) An input/output component 406;
d) A heat modeler 410, which can be configured to store a heat model for each oven level 120 130 of the oven 110;
e) A heat manager 412, which can be configured to calculate the estimated heat demand, $PQ_{sp}$, to adjust to a predetermined temperature set point;
f) A feedback controller 414, which can be configured to execute a control loop feedback calculation to optimize $PQ_{sp}$ to derive $PQ_{opt}$; and
g) A valve controller 416, which is configured to adjust a variable flow control valve 320 of a gas flow network 300; all connected via
h) A data bus 420.

In a related embodiment, the heat modeler 410, can be configured to store a heat model for each oven level, such that the heat model stores model parameters for each oven level 120 130, wherein the model parameters include:

$C_e$ the heat capacity of the oven level, including products in production;
$PQ_p$ the general heat loss, also called parasitic loss;
$PQ_L$ the product heat loss which is the heat loss from product load (main loss is typically boiling water and heat loss from accumulated heat in product moving through oven level); and
$PQ_B$ the heat required to hold current temperature, which is:

$$PQ_B = PQ_p + PQ_L.$$

In a related embodiment, the heat manager 412, can be configured to calculate the estimated heat demand $PQ_{sp}$, to adjust the at least one oven level to a predetermined temperature set point, wherein:

$$PQ_{sp} = PQ_B + PQ_m = PQ_p + PQ_L + PQ_m = PQ_p + PQ_L + \frac{C_e \Delta T}{t_R}$$

In a further related embodiment, the control loop feedback algorithm of the feedback controller can be a proportional-integral-derivative controller algorithm, such that:

$$PQ_{opt}(t) = K_p PQ_{sp}(t) + K_i \int PQ_{sp}(t)dt + K_d \frac{d}{dt}[PQ_{sp}(t)]$$

where $K_p$, $K_i$, and $K_d$ are tuning coefficients for respectively the proportional, integral, and derivative terms.

In a yet further related embodiment, wherein the parameters $PQ_p$ and $PQ_L$ can be constant or substantially constant, the control loop feedback algorithm of the feedback controller can be a simplified proportional-integral-derivative controller algorithm, such that:

$$PQ_{opt}(t) = K_{p1}PQ_p + K_{p2}PQ_L + K_{p2}\frac{C_e \Delta T}{t_R} + K_i \int \frac{C_e \Delta T}{t_R}dt + K_d \frac{d}{dt}\left[\frac{C_e \Delta T}{t_R}\right]$$

where $K_{p1}$, $K_{p2}$, and $K_{p3}$ are tuning coefficients for the proportional terms; and $K_i$, and $K_d$ are the tuning coefficients for the integral and derivative terms.

Figure 5:
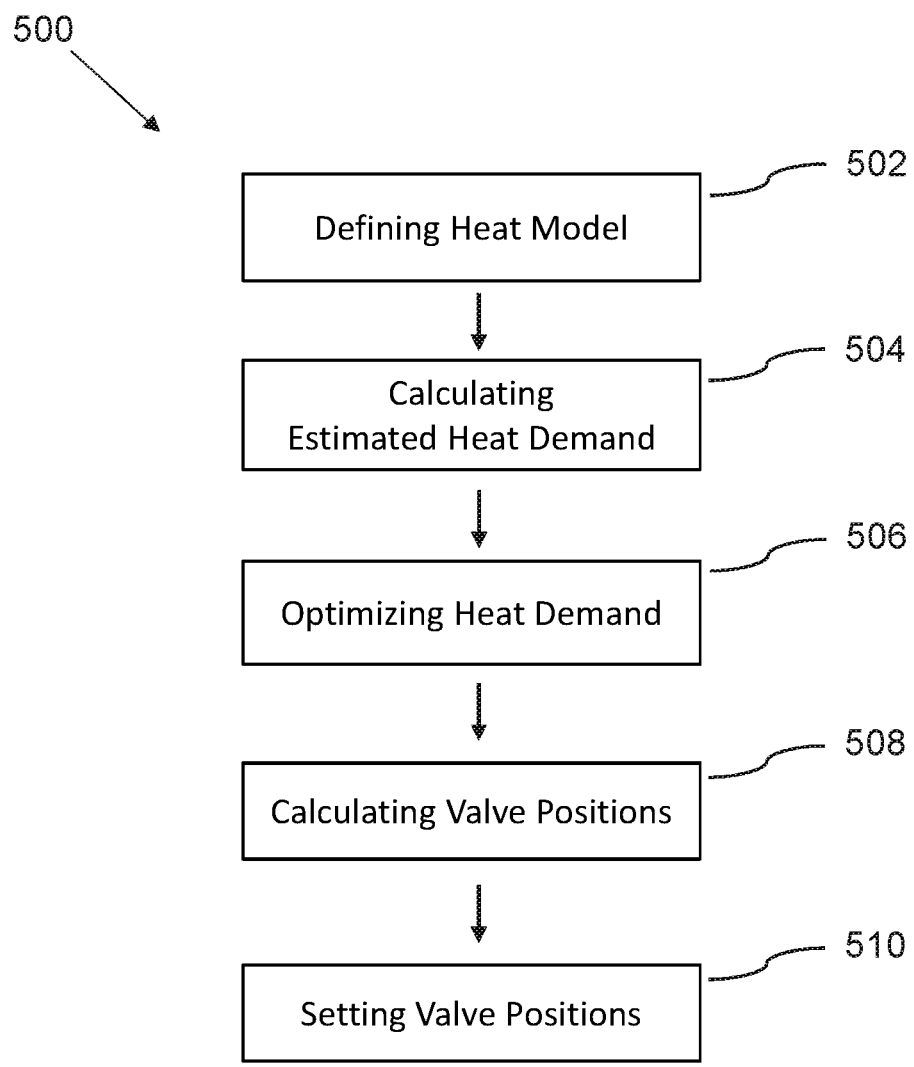
FIG. 5 is a flowchart illustrating steps that may be followed, in accordance with one embodiment of a method or process of oven temperature control.

In a related embodiment, for a predetermined setting of the on/off flow control valves 331 332 333 334, with respective predetermined valve positions $B_{1s}$, $B_{2s}$, $B_{3s}$, $B_{4s}$, the valve controller 416 can be configured to adjust a variable flow control valve 320, by calculating an optimal valve position for the variable flow control valve 320, such that the aggregated heat output is equal to the optimized heat demand, $PQ_{opt}$, to adjust to a predetermined temperature set point, which is equivalent to solving for FCV in the equation:

a) $PQ_{opt} = HV_{gas}FCV(B_{1s}FL_{max1} + B_{2s}FL_{max2} + B_{3s}FL_{max3} + B_{4s}FL_{max4})$ whereby b) $FCV = \dfrac{PQ_{opt}}{HV_{gas}(B_{1s}FL_{max1} + B_{2s}FL_{max2} + B_{3s}FL_{max3} + B_{4s}FL_{max4})}$ In an embodiment, as illustrated in FIG. 5, a method for oven heat control 500, can include:

a) Defining a heat model 502, wherein the heat model is defined for at least one oven level 120 of an oven 110;
b) Calculating an estimated heat demand 504, wherein a heat control unit 150 calculates the estimated heat demand to adjust the at least one oven level 120 to a predetermined temperature set point, by using the heat model;
c) Optimizing the estimated heat demand 506, wherein the heat control unit 150 executes a control loop feedback algorithm to optimize the estimated heat demand $PQ_{sp}$, thereby calculating an optimized heat demand value, $PQ_{opt}$;
d) Calculating valve positions 508, wherein the heat control unit 150 calculates an optimized valve position to produce the desired power output $PQ_{opt}$;
e) Setting valve positions 510, wherein the heat control unit 150 adjust the position of the variable flow control valve 320 to the optimized valve position.

In some embodiments, there may be only one temperature zone associated with each oven level 120 130 of the oven 110.

In alternative embodiments, an oven level 120 may have multiple, typically two, temperature zones. In related embodiments, wherein the multiple temperature zones are distinct, each temperature zone in the oven level 120 can be independently controlled according to distinct/independent applications of the method for oven heat control 500.

In a related embodiment, with two temperature zones for one oven level 120, a first or upper set of burners can be configured above the belt in order to emit radiant heat for toasting the surface of food products that are positioned on the oven belt 128, and a second or lower set of burners can be configured below the belt, to run at a lower temperature, such that the lower set of burners ensure additional baking of the of food products.

Figure 7:
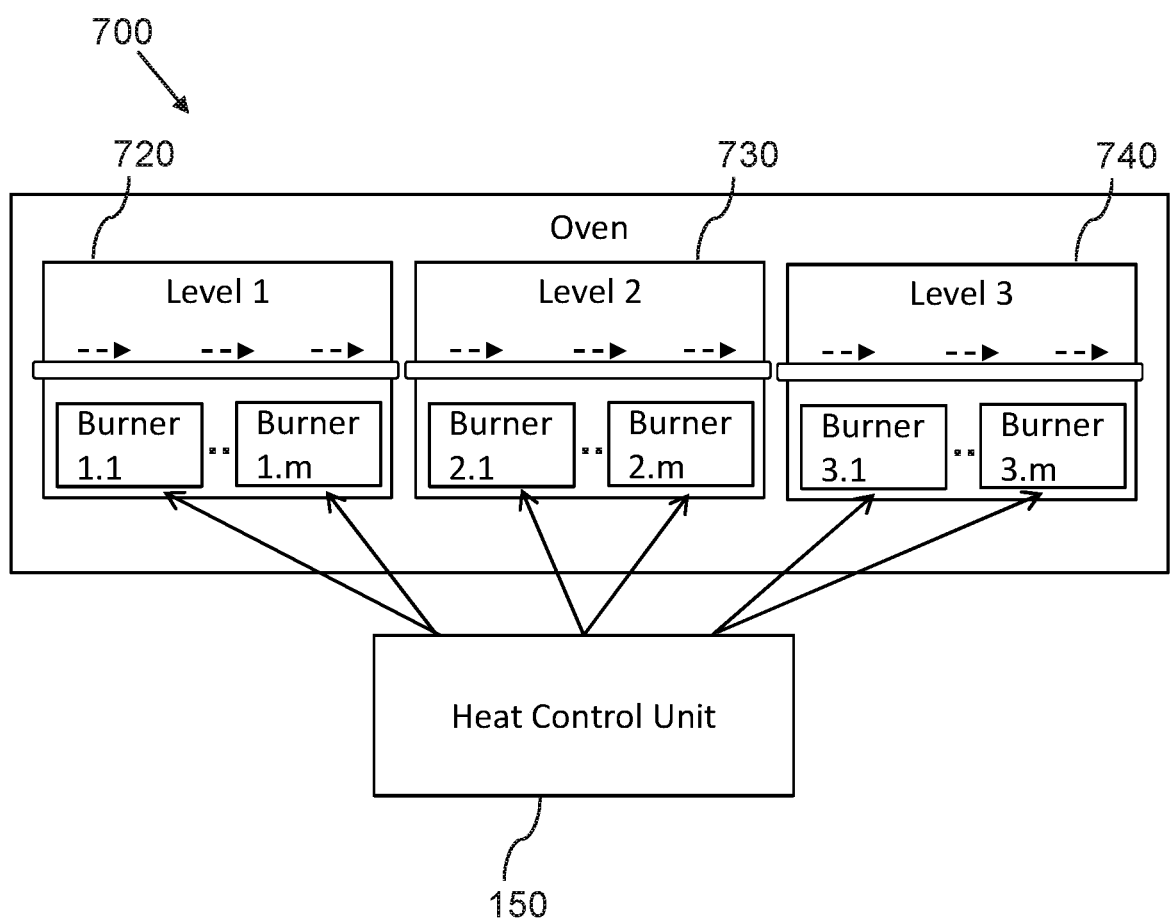
FIG. 7 is a schematic diagram illustrating a temperature controlled oven system, according to an embodiment of the invention.

In an embodiment, FIG. 7 illustrates an embodiment of a heat controlled oven system 700 with three oven levels 720 730 740.

FIGS. 1, 2, 4 and 5 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1, 2, 4, and 5 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the heat control unit 150 are to be interpreted in the most general manner.

For example, the processors 402 can include a single physical microprocessor or microcontroller, a cluster of processors, a datacenter or a cluster of datacenters, a computing cloud service, and the like.

In a further example, the non-transitory memory 404 can include various forms of non-transitory storage media, including random access memory and other forms of dynamic storage, and hard disks, hard disk clusters, cloud storage services, and other forms of long-term storage. Similarly, the input/output 406 can include a plurality of well-known input/output devices, such as screens, keyboards, pointing devices, motion trackers, communication ports, and so forth.

Furthermore, it shall be understood that the heat control unit 150 can include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the heat control unit 150 communicates with the oven 110 over a network, which can include the general Internet, a Wide Area Network or a Local Area Network, or another form of communication network, transmitted on wired or wireless connections. Wireless networks can for example include Ethernet, Wi-Fi, Bluetooth, ZigBee, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the heat controlled oven system 100 device, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Figure 6:
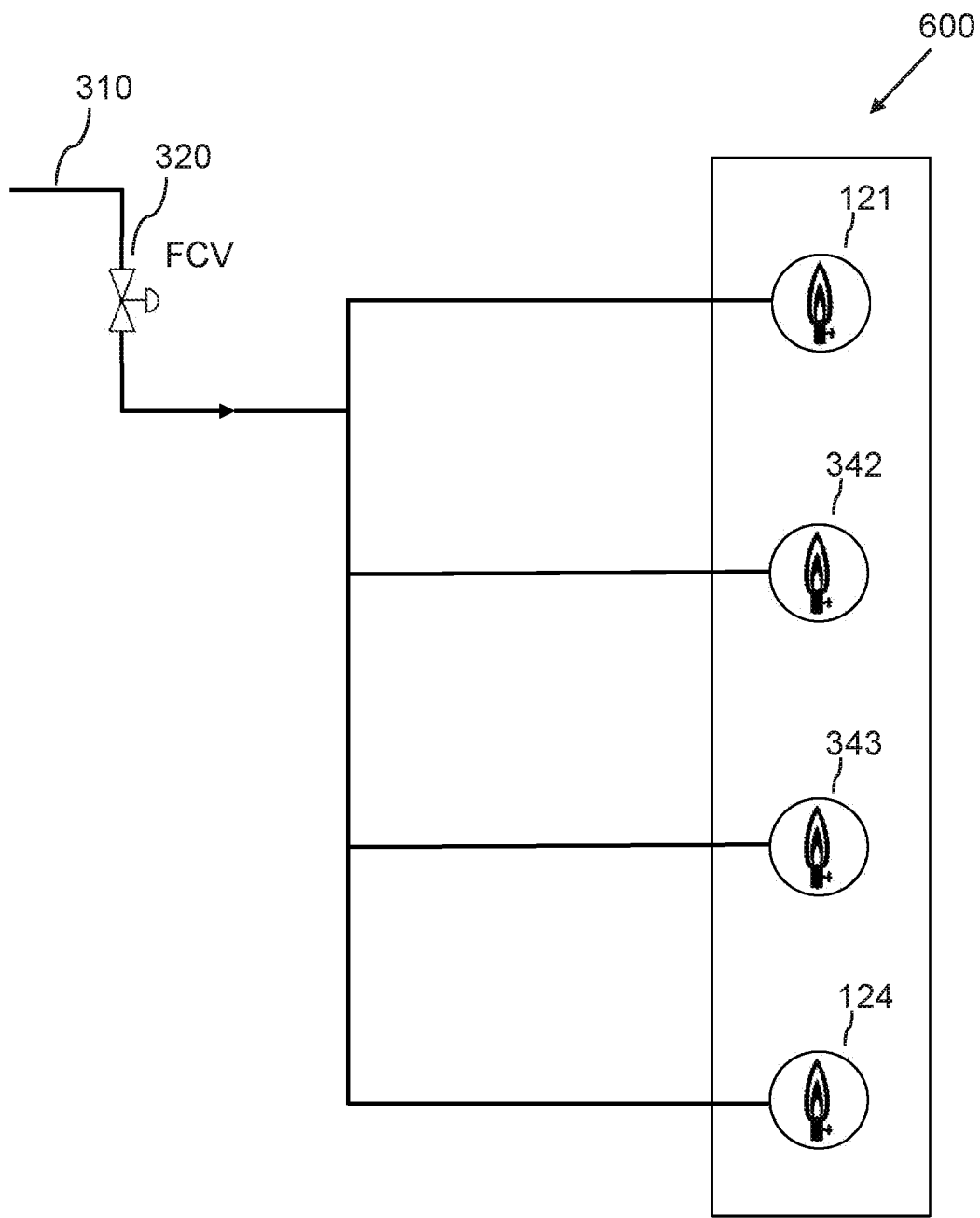
FIG. 6 is a schematic diagram illustrating gas flow for a single belt of an oven, according to an embodiment of the invention.

For example, embodiments can incorporate many alternative designs for a gas flow network. In a related embodiment, FIG. 6 illustrates a gas flow network 600 for a single oven level 120, with a belt 128, including:
- d) a pressure regulated gas supply line 310;
- e) a variable flow control valve 320, which is connected to the gas supply line 310, such that an output from the variable flow control valve 320 is connected to burner 121 342 343 124.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A heat control unit, comprising:
a) a processor;
b) a non-transitory memory;
c) an input/output component;
d) a heat modeler, which is configured to store a heat model for at least one oven level in an oven, wherein the heat model comprises a heat capacity, a general heat loss, a product heat loss, and a heat required to hold a current temperature;
e) a heat manager, which is configured to calculate an estimated heat demand to adjust the at least one oven level to a temperature set point, using the heat model of the at least one oven level; and
wherein the heat control unit is configured to control at least one gas burner in the at least one oven level, in order to control a baking temperature of the at least one oven level;
wherein the heat manager calculates the estimated heat demand as a sum of the general heat loss, the product heat loss, and a heat required to change a current temperature.

2. The heat control unit of claim 1, wherein the heat control unit further comprises:
a feedback controller, which is configured to execute a control loop feedback algorithm to calculate an optimized heat demand based on the estimated heat demand.

3. The heat control unit of claim 2, wherein the control loop feedback algorithm is a proportional-integral-derivative controller algorithm.

4. The heat control unit of claim 2, wherein the heat control unit further comprises:
a valve controller, which is configured to calculate an optimal valve position for a variable flow control valve and adjust the variable flow control valve to the optimal valve position, such that a heat output is equal to the optimized heat demand.

5. A heat control unit, comprising:
a) a processor;
b) a non-transitory memory;
c) an input/output component;
wherein the heat control unit is configured to control a baking temperature of at least one oven level of an oven;
wherein the heat control unit is configured to store a heat model for the at least one oven level in the oven, wherein the heat model comprises a heat capacity, a general heat loss, a product heat loss, and a heat required to hold a current temperature;
wherein the heat control unit is configured to calculate an estimated heat demand to adjust the at least one oven level to a temperature set point, using the heat model of the at least one oven level; and
wherein the heat control unit calculates the estimated heat demand as a sum of the general heat loss, the product heat loss, and a heat required to change a current temperature.

6. The heat control unit of claim 5, wherein the heat control unit is further configured to execute a control loop feedback algorithm to calculate an optimized heat demand based on the estimated heat demand.

7. The heat control unit of claim 6, wherein the control loop feedback algorithm is a proportional-integral-derivative controller algorithm.

8. The heat control unit of claim 6, wherein the heat control unit is further configured to control at least one gas burner in the at least one oven level; and wherein the heat control unit is further configured to calculate an optimal valve position for a variable flow control valve and adjust the variable flow control valve to the optimal valve position, such that a heat output is equal to the optimized heat demand.

9. A method for oven heat control, comprising:
a) defining a heat model, wherein the heat model is defined for at least one oven level of an oven, wherein the heat model comprises a heat capacity, a general heat loss, a product heat loss, and a heat required to hold current temperature; and
b) calculating an estimated heat demand, wherein a heat control unit calculates the estimated heat demand to adjust the at least one oven level to a predetermined temperature set point, by using the heat model, wherein the heat control unit calculates the estimated heat demand as the sum of the general heat loss, the product heat loss, and a heat required to change a current temperature; and
c) adjusting the at least one oven level to the predetermined temperature set point using the estimated heat demand, wherein the heat control unit controls a baking temperature of the at least one oven level.

10. The method for oven heat control of claim 9, further comprising:
optimizing the estimated heat demand, wherein the heat control unit executes a control loop feedback algorithm to optimize the estimated heat demand, thereby calculating an optimized heat demand.

11. The method for oven heat control of claim 10, wherein the control loop feedback algorithm is a proportional-integral-derivative controller algorithm.

12. The method for oven heat control of claim 10, further comprising:
a) calculating a valve position, wherein the heat control unit calculates an optimized valve position for a variable flow control valve that is connected to a gas burner of the at least one oven level, to produce the optimized heat demand; and b) setting the valve position, wherein the heat control unit adjusts the valve position of the variable flow control valve to the optimized valve position.

* * * * *